(12) United States Patent
Wang et al.

(10) Patent No.: US 8,719,806 B2
(45) Date of Patent: May 6, 2014

(54) SPECULATIVE MULTI-THREADING FOR INSTRUCTION PREFETCH AND/OR TRACE PRE-BUILD

(75) Inventors: Hong Wang, Fremont, CA (US); Tor M. Aamodt, Toronto (CA); Pedro Marcuello, Barcelona (ES); Jared W. Stark, IV, Portland, OR (US); John P. Shen, San Jose, CA (US); Antonio Gonzalez, Barcelona (ES); Per Hammarlund, Hillsboro, OR (US); Gerolf F. Hoflehner, Santa Clara, CA (US); Perry H. Wang, San Jose, CA (US); Steve Shih-wei Liao, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 251 days.

(21) Appl. No.: 12/879,898

(22) Filed: Sep. 10, 2010

(65) Prior Publication Data

US 2010/0332811 A1 Dec. 30, 2010

Related U.S. Application Data

(60) Division of application No. 10/423,633, filed on Apr. 24, 2003, now Pat. No. 7,814,469, which is a continuation-in-part of application No. 10/356,435, filed on Jan. 31, 2003, now abandoned.

(51) Int. Cl.
*G06F 9/45* (2006.01)
(52) U.S. Cl.
USPC ............................. 717/149; 717/150; 717/151
(58) Field of Classification Search
None
See application file for complete search history.

(56) References Cited

U.S. PATENT DOCUMENTS

| | | | |
|---|---|---|---|
| 6,065,115 A | 5/2000 | Sharangpani et al. | |
| 6,301,705 B1 * | 10/2001 | Doshi et al. | 717/154 |
| 6,389,446 B1 * | 5/2002 | Torii | 718/100 |
| 6,493,820 B2 | 12/2002 | Akkary et al. | |
| 6,532,521 B1 * | 3/2003 | Arimilli et al. | 711/137 |
| 6,574,725 B1 * | 6/2003 | Kranich et al. | 712/31 |
| 6,615,333 B1 | 9/2003 | Hoogerbrugge et al. | |
| 6,654,874 B1 * | 11/2003 | Lee | 712/209 |
| 6,658,578 B1 * | 12/2003 | Laurenti et al. | 713/324 |
| 6,687,809 B2 | 2/2004 | Chowdhury et al. | |
| 6,711,671 B1 | 3/2004 | Undy et al. | |
| 2002/0144062 A1 | 10/2002 | Nakamura | |
| 2002/0144083 A1 | 10/2002 | Wang et al. | |
| 2002/0199179 A1 | 12/2002 | Lavery et al. | |
| 2003/0074653 A1 | 4/2003 | Ju et al. | |
| 2003/0105942 A1 | 6/2003 | Damron et al. | |
| 2003/0145314 A1 * | 7/2003 | Nguyen et al. | 717/158 |
| 2003/0172255 A1 | 9/2003 | Dundas | |
| 2004/0054990 A1 | 3/2004 | Liao et al. | |
| 2004/0073906 A1 * | 4/2004 | Chamdani et al. | 718/102 |
| 2004/0088488 A1 | 5/2004 | Ober et al. | |
| 2004/0123081 A1 * | 6/2004 | Knies et al. | 712/225 |
| 2004/0199752 A1 * | 10/2004 | Winberg et al. | 712/225 |
| 2007/0113038 A1 * | 5/2007 | Hobson et al. | 711/168 |

OTHER PUBLICATIONS

Gonzalez et al. "Thread-Spawning Schemes for Speculative Multithreading", Feb. 2002, HPCA'02.*

* cited by examiner

*Primary Examiner* — Isaac Tecklu
(74) *Attorney, Agent, or Firm* — Blakely, Sokoloff, Taylor & Zafman LLP

(57) ABSTRACT

The latencies associated with retrieving instruction information for a main thread are decreased through the use of a simultaneous helper thread. The helper thread is a speculative prefetch thread to perform instruction prefetch and/or trace pre-build for the main thread.

14 Claims, 11 Drawing Sheets

SPECULATIVE MULTI-THREADING FOR INSTRUCTION PREFETCH AND/OR TRACE PRE-BUILD

RELATED APPLICATIONS

The present application is a divisional of U.S. patent application Ser. No. 10/423,633, filed on Apr. 24, 2003, entitled "SPECULATIVE MULTI-THREADING FOR INSTRUCTION PREFETCH AND/OR TRACE PRE-BUILD", which is a continuation-in-part of prior U.S. patent application Ser. No. 10/356,435, filed on Jan. 31, 2003, entitled "CONTROL-QUASI-INDEPENDENT-POINTS GUIDED SPECULATIVE MULTITHREADING."

BACKGROUND

1. Technical Field

The present disclosure relates generally to information processing systems and, more specifically, to prefetch of instruction information via speculative pre-execution of a helper thread.

2. Background Art

In order to increase performance of information processing systems, such as those that include microprocessors, both hardware and software techniques have been employed. On the hardware side, microprocessor design approaches to improve microprocessor performance have included increased clock speeds, pipelining, branch prediction, superscalar execution, out-of-order execution, and caches. Many such approaches have led to increased transistor count, and have even, in some instances, resulted in transistor count increasing at a rate greater than the rate of improved performance.

Rather than seek to increase performance through additional transistors, other performance enhancements involve software techniques. One software approach that has been employed to improve processor performance is known as "multithreading." In software multithreading, an instruction stream is split into multiple instruction streams that can be executed in parallel.

In one approach, known as time-slice multithreading or time-multiplex ("TMUX") multithreading, a single processor switches between threads after a fixed period of time. In still another approach, a single processor switches between threads upon occurrence of a trigger event, such as a long latency cache miss. In this latter approach, known as switch-on-event multithreading, only one thread, at most, is active at a given time.

Increasingly, multithreading is supported in hardware. For instance, in one approach, processors in a multi-processor system, such as a chip multiprocessor ("CMP") system, may each act on one of the multiple threads simultaneously. In another approach, referred to as simultaneous multithreading ("SMT"), a single physical processor is made to appear as multiple logical processors to operating systems and user programs. In SMT, multiple threads can be active and execute simultaneously on a single processor without switching. That is, each logical processor maintains a complete set of the architecture state, but many other resources of the physical processor, such as caches, execution units, branch predictors control logic and buses are shared. The instructions from multiple threads execute simultaneously and may make better use of shared resources than TMUX multithreading or switch-on-event multithreading.

Even in processors that utilize multithreading to increase performance, a performance penalty is paid during the latency period associated with fetching of instruction information.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method and apparatus for speculative multi-threading for instruction prefetch and/or trace pre-build.

DETAILED DESCRIPTION

Described herein are selected embodiments of an apparatus and methods related to performing prefetch of instruction information for a main thread in a multi-threaded environment through the use of speculative helper threads. The hardware that supports multithreading is, at times, not utilized and remains idle. During such times, idle multithreading hardware is utilized to pre-fetch instruction information (assuming that the execution path for the main thread has been accurately determined). Embodiments of the method and apparatus disclosed herein address this and other concerns related to prefetch of instruction information via speculative pre-execution by a helper thread.

In the following description, numerous specific details such as processor types, multithreading environments, spawning pair selection methods, context switch methodology, and trace construction methodology have been set forth to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

Some embodiments of the apparatus include a mechanism to mark instructions from a speculative helper thread as being "speculative," and also include dependence blocker logic to prevent bypass of speculative Store data to a non-speculative Load instruction. Some embodiments of the apparatus also include store blocker logic to prevent the commission of speculative Store data to memory.

Some embodiments of the method include a determination of those code regions that are likely to incur performance loss due to a miss in the instruction cache or trace cache. Selected embodiments of the method also include selection of helper thread spawn points and target points based on an analysis of control independence, in an effort to achieve speculative prefetch of instruction information with minimal misspeculation in relation to control flow.

Figure 1:
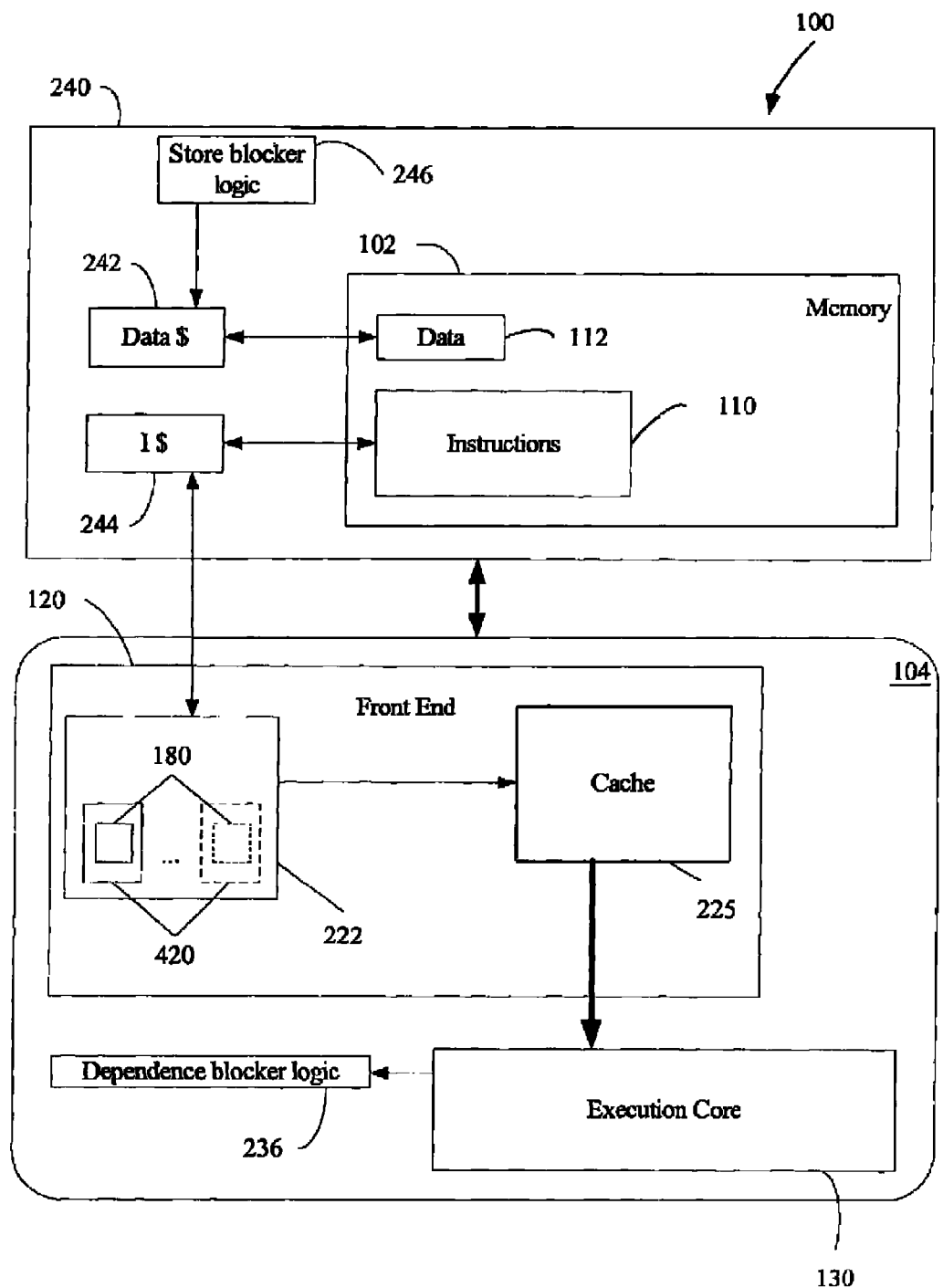
FIG. 1 is a block diagram of at least one embodiment of a processing system that may utilize disclosed techniques.

FIG. 1 is a block diagram illustrating at least one embodiment of a computing system 100 capable of performing the disclosed techniques. The computing system 100 includes a processor 104 and a memory 102. Memory 102 may store instructions 110 and data 112 for controlling the operation of the processor 104. The processor 104 may include a front end 120 that supplies instruction information to an execution core 130. The front end 120 may supply the instruction information to the processor core 104 in program order.

For at least one embodiment, the front end 120 includes a fetch/decode unit 222 that includes logically independent sequencers 420 for each of a plurality of thread contexts. The logically independent sequencer(s) 420 may include marking logic 180 to mark the instruction information for speculative threads as being "speculative." One skilled in the art will recognize that, for an embodiment implemented in a multiple processor multithreading environment, such as 450 discussed below in connection with FIG. 4, only one sequencer 420 may be included in the fetch/decode unit 222. The optional nature of additional sequencer(s) 420 and associated marking logic 180 in a multiple processor multithreading environment (such as 450 in FIG. 4) are denoted by dotted lines in FIGS. 1-3.

As used herein, the term "instruction information" is meant to refer to instructions that can be understood and executed by the execution core 130. Instruction information may be stored in a cache 225. The cache 225 may be implemented as an execution instruction cache (224, FIG. 2) or an execution trace cache (324 FIG. 3). For embodiments that utilize an execution instruction cache, such as the embodiment discussed below in connection with FIG. 2, "instruction information" includes instructions that have been fetched from an instruction cache and decoded. For embodiments that utilize a trace cache, such as the embodiment discussed below in connection with FIG. 3, the term "instruction information" includes traces of decoded micro-operations. For embodiments that utilize neither an execution instruction cache nor trace cache, "instruction information" also includes raw bytes for instructions that may stored in an instruction cache (such as I-cache 244 illustrated in FIGS. 2 and 3).

Figure 2:
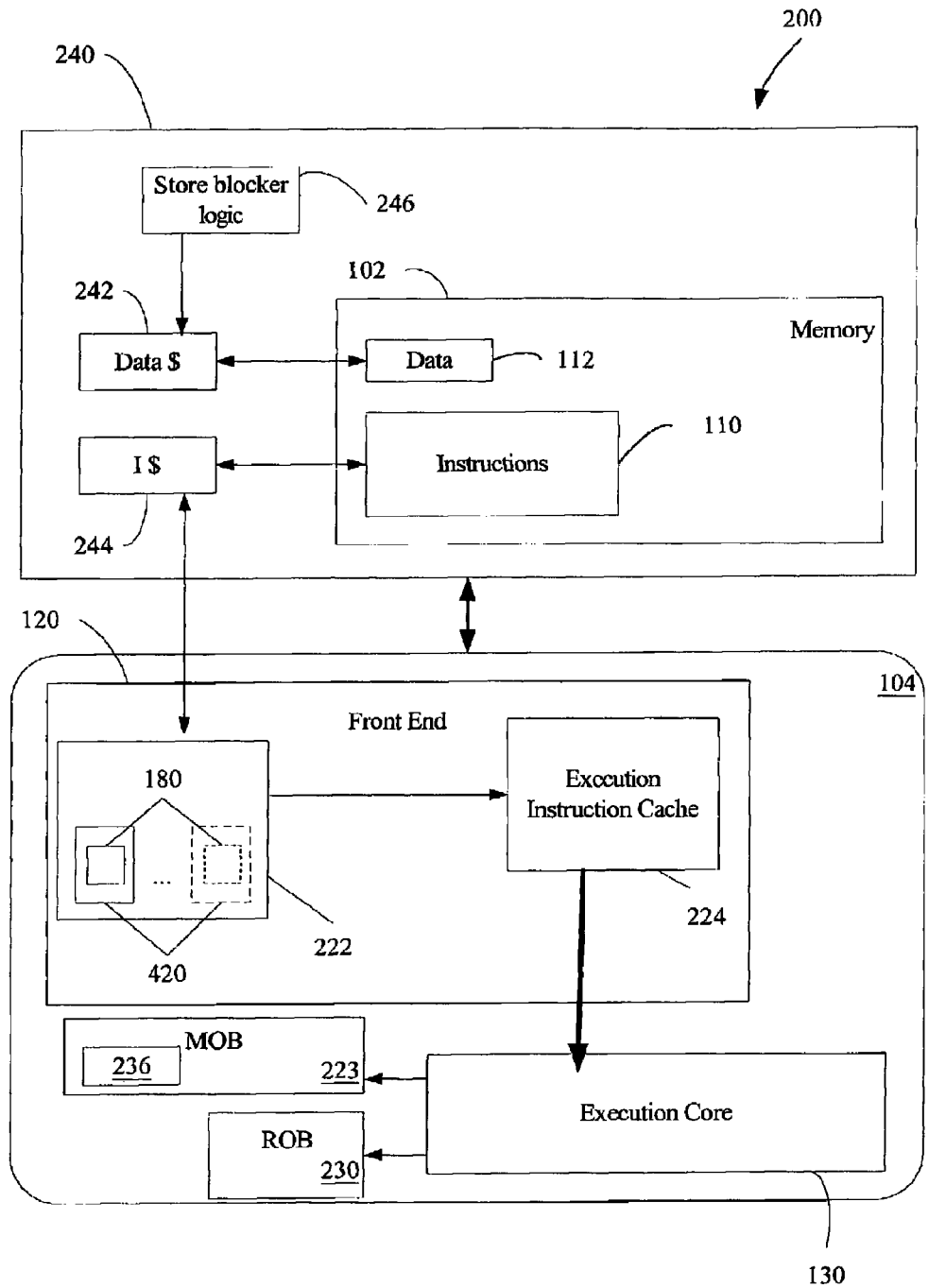
FIG. 2 is a block diagram illustrating of at least one embodiment of a processing system that utilizes an execution instruction cache.
Figure 3:
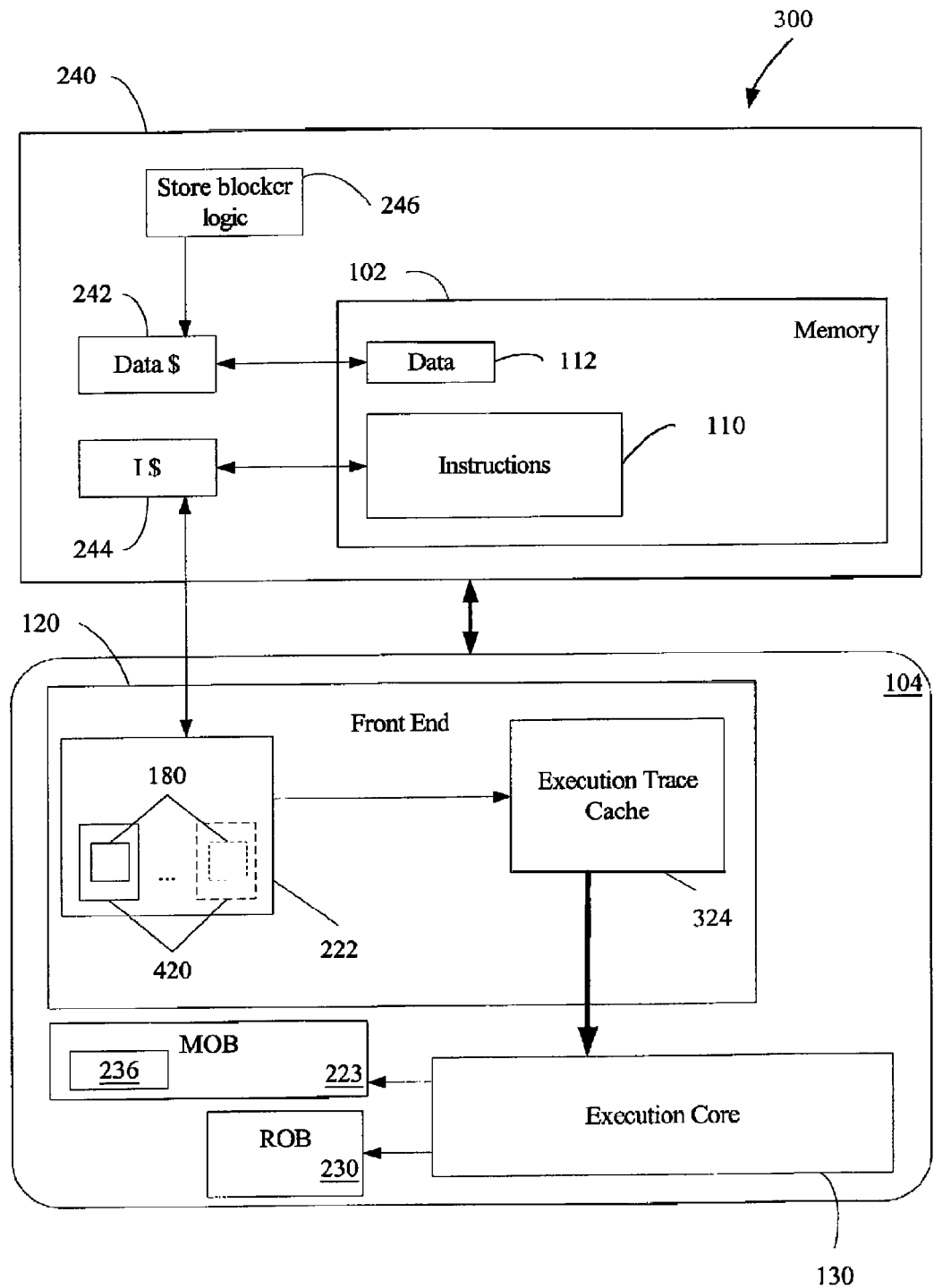
FIG. 3 is a block diagram of at least one embodiment of a processing system that utilizes an execution trace cache.

FIGS. 2 and 3 disclose alternative embodiments 200, 300, respectively, of a more detailed view of the general processing system 100 disclosed in FIG. 1. For both systems 200, 300, the front end 120 prefetches instructions that are likely to be executed. A branch prediction unit (not shown) may supply branch prediction information in order to help the front end 120 determine which instructions are likely to be executed.

The processing systems 200, 300 include a memory subsystem 240 that may include one or more logical caches 242, 244 along with the memory 102. The memory subsystem 240 may be implemented as a memory hierarchy and may also include a bus and related control logic in order to facilitate the transfer of information from memory 102 to the hierarchy levels. For at least one embodiment, the control logic includes store blocker logic 246 to prevent commission of speculative Store data to memory 102. One skilled in the art will recognize that various configurations for a memory hierarchy may be employed, including non-inclusive hierarchy configurations.

FIG. 2 illustrates an embodiment 200 of a processing system that includes an execution instruction cache 224. A fetch/decode unit 222 may be utilized to fetch and decode instructions from the I-cache 244 and place them into an execution instruction cache 224. The execution instruction cache 224 provides decoded instructions, sometimes generically referred to herein as "instruction information," to the processor core 130 upon a hit in the execution instruction cache 224.

FIG. 3 illustrates an embodiment 300 that includes an execution trace cache 324. The fetch/decode unit 222 decodes instructions into micro-operations that can be understood by the execution units (not shown) of the processor core 130, and stores the decoded micro-operations ("micro-ops") in the execution trace cache 324. Upon a hit in the trace cache 324, the front end 120 delivers decoded micro-operations, sometimes generically referred to herein as "instruction information," from the trace cache 324 to the processor core 130.

For at least one embodiment, the trace cache 324 is a high-speed memory that stores decoded micro-ops in the order of program execution. Decoded instructions are stored in the trace cache 324 after they have been fetched, decoded, and built into sequences of micro-ops called "traces". This storage of decoded instructions may provide enhanced performance, because it allows for, instead of repeating fetch and decode processes, retrieving the decoded instruction from the trace cache 324. Such re-use is useful, for instance, with repeated code sequences such as loop structures.

During execution, the processor 104 searches the trace cache 324 for the instruction it needs. If that instruction appears in an existing trace, the fetch and decode of instructions from the memory hierarchy ceases and the trace cache 324 becomes the new source of instructions. If the program in execution incurs a miss in the trace cache 324, then a new trace is built. During building of new traces, instruction fetch from the I-cache 244 may incur cache misses. As is explained immediately below, the I-cache 244 may be "warmed up" when instructions are fetched into the I-cache 244 upon an I-cache miss during the trace build process.

In many embodiments, it may be desirable to forward instructions from the trace cache 324 to the processor core 130 during execution. For processors that use a trace cache 324, accesses to the instruction cache 244 occur during trace cache build mode (such as when a trace cache miss is being serviced). Therefore, instruction fetch from the instruction cache or a higher level of the memory hierarchy often occurs during a trace build mode in embodiments where a trace cache 324 is utilized. Accordingly, in such a system trace building and instruction fetching are closely related.

FIGS. 2 and 3 illustrate that the processing systems 200, 300, respectively, may also include a reorder buffer ("ROB") 230 to help provide for in-order retirement of instructions that have been executed out of program order by execution core 130. The reorder buffer 230 buffers completed micro-ops, updates the architectural state in order, and manages the order of exceptions.

FIGS. 2 and 3 illustrate that the processing systems 200, 300, respectively, may also include a memory order buffer ("MOB") 223 to act as a separate schedule and dispatch engine for data Load and Store instructions. The MOB 223 may also temporarily hold the state of outstanding Load and Store instructions from dispatch to completion. This state information may be maintained in load request buffers and store request buffers (not shown). For at least one embodiment, the MOB 223 includes dependence blocker logic 236 to prevent Store data from a Store instruction of a speculative thread from being bypassed to a Load instruction of a non-speculative thread. For at least one embodiment, the dependence blocker logic 236 may permit store-forwarding of speculative Store data among speculative threads.

It will be apparent to one of skill in the art that, although only out-of-order processing systems 200, 300 are illustrated, the embodiments of multi-threading for instruction prefetch and/or trace pre-build discussed herein are equally applicable to in-order processing systems as well. Such processing systems will likely not include ROB 230 or MOB 223.

It will also be understood that the embodiments described herein may be utilized on systems that store standard, non-decoded instructions in an execution instruction cache 224 or trace cache 324. In such systems, a decoder 222 may be placed between the cache 224 or 324 and the execution core 130. In such cases, the instruction information stored in the execution instruction cache 224 or trace cache 324 includes undecoded instructions rather than decoded micro-ops.

Figure 5:
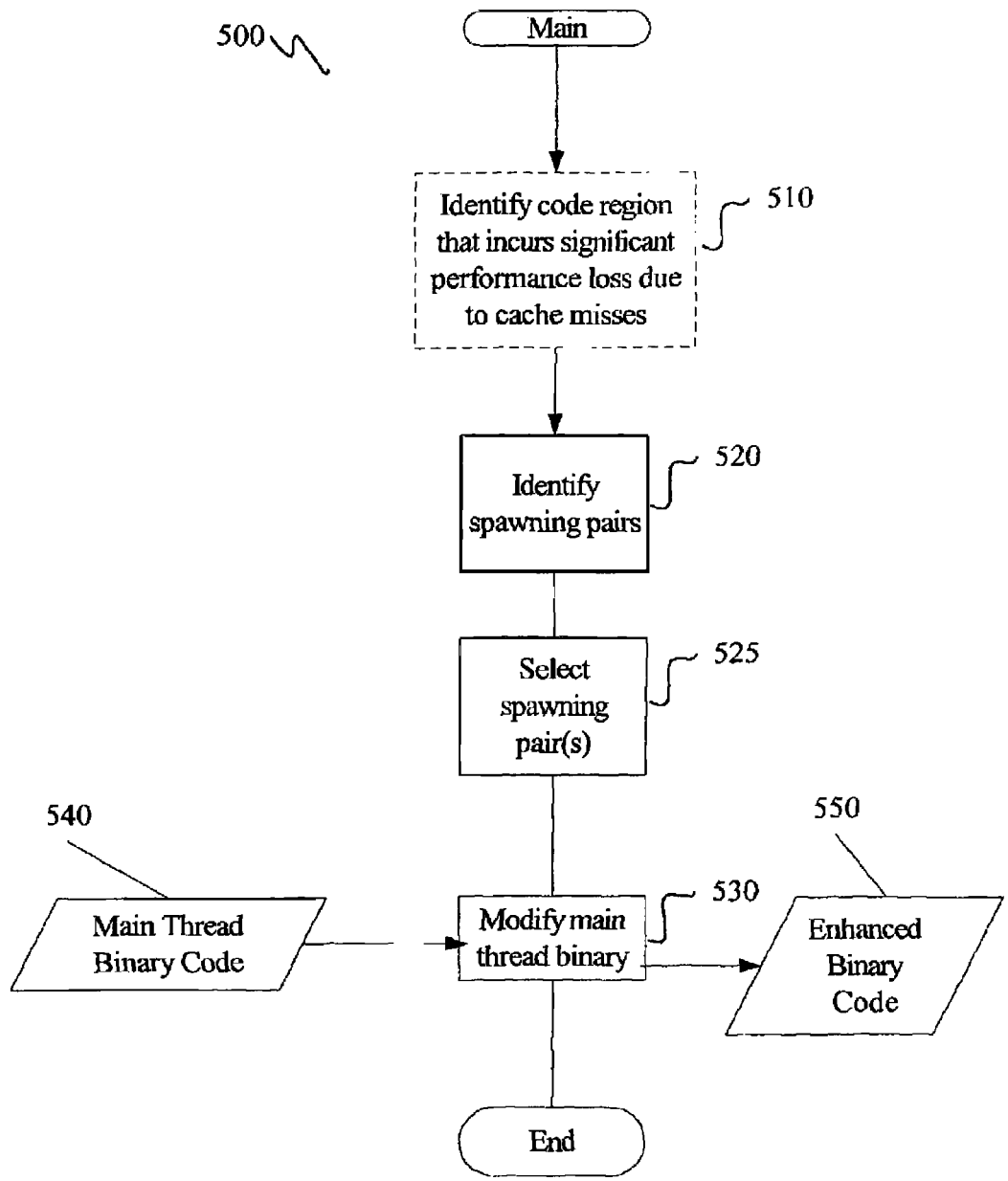
FIG. 5 is a flowchart illustrating at least one embodiment of a method of generating instructions that provide for speculative multi-threading for instruction prefetch and/or trace pre-build.

Accordingly, the discussion above illustrates that alternative embodiments 200, 300 of a processing system 100 provide for forwarding of instruction information from a cache 225 (which may be implemented as an execution instruction cache 224 or an execution trace cache 324) to a processor execution core 130. (The method 500 discussed below in connection with FIG. 5 provides for prefetching of instruction information into the cache (224 or 324)). All or part of the instruction information may also be forwarded to other structures. For instance, in embodiments related to out-of-order processing systems, instruction information may also be forwarded to ROB 230 and/or MOB 223.

As is discussed above, approaches for multithreading include simultaneous multithreading and multiple processor multithreading (including CMP). These two approaches, in particular, reflect a trend toward supporting multithreading in hardware.

Figure 4:
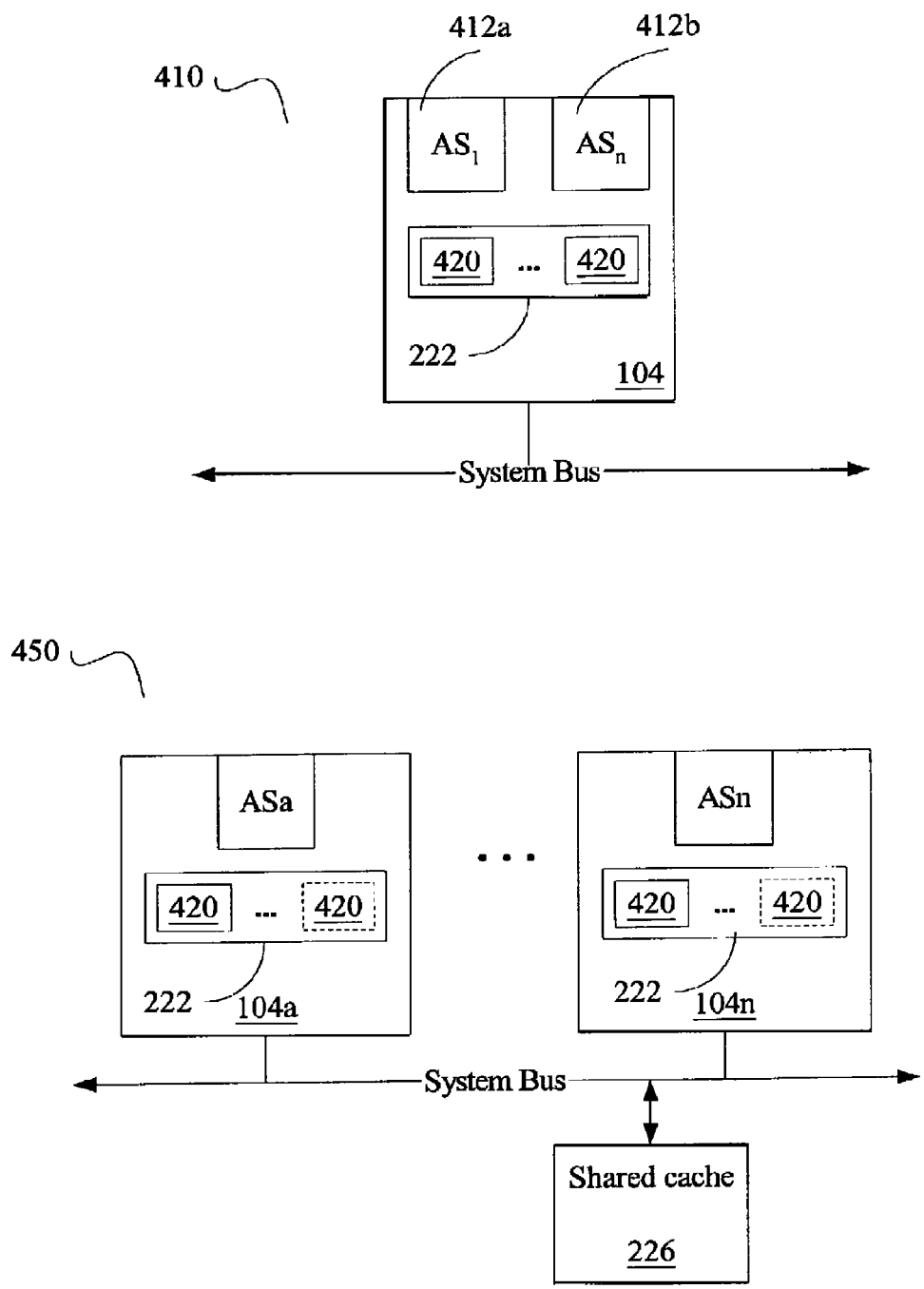
FIG. 4 is a block diagram illustrating selected features of multithreading hardware according to at least one embodiment.

FIG. 4 illustrates selected hardware features of an SMT multithreading environment 410 and a multiple processor multithreading environment 450. In the SMT environment 410, a single physical processor 104 is made to appear as multiple logical processors (not shown), referred to herein as $LP_1$ through $LP_n$, to operating systems and user programs. Each logical processor $LP_1$ through LPn maintains a complete set of the architecture state $AS_1$-$AS_n$, respectively. The architecture state includes, for at least one embodiment, data registers, segment registers, control registers, debug registers, and most of the model specific registers. The logical processors $LP_1$-$LP_n$ share most other resources of the physical processor 104, such as caches, execution units, branch predictors, control logic and buses. Although such features, including the fetch/decode unit (such as fetch/decode unit 222 in FIGS. 2 and 3) are shared, each thread context in the multithreading environment 410 can independently generate the next instruction address (and perform, for instance, a fetch from an instruction cache such as 244, an execution instruction cache such as 224, or from a trace cache such as 324). Thus, each thread context includes a logically independent sequencer 420 to fetch instruction information, even though the multiple logical sequencers may be implemented in a single shared physical fetch/decode unit 222.

FIG. 4 also illustrates at least one embodiment of a multi-processor multithreading environment 450. Such an environment 450 includes two or more separate physical processors 104a-104n that is each capable of executing a different thread such that execution of at least portions of the different threads may be ongoing at the same time. Each processor 104a through 104n includes a physically independent fetch unit (such as fetch/decode unit 222 in FIGS. 2 and 3) to fetch instruction information for its respective thread. In an embodiment where each processor 104a-104n executes a single thread, the fetch/decode unit 222 implements a single sequencer 420. However, in an embodiment where each processor 104a-104n supports multiple thread contexts, the fetch/decode unit 222 implements a distinct logical sequencer 420 for each supported thread context. The optional nature of additional sequencers 420 in a multiprocessor environment is denoted by dotted lines in FIG. 4. FIG. 4 illustrates that the multiple processors 104a through 104n share a cache 226, so that a speculative thread running on one processor 104a-104n can perform instruction information prefetch for a non-speculative thread running on a different processor 104a-104n.

The embodiments of a method for speculative prefetch of instruction information discussed below can be implemented on any of the processing systems 100, 200, 300 and on any of the multithreading environments 410, 450 described above. For embodiments implemented on a multiprocessor multi-threading environment 450, the embodiment includes a shared cache 226 as illustrated in FIG. 4. Each processor 104 in such environment 450 also includes dependence blocker logic 236 and store blocker logic 246 as shown and discussed above in connection with FIGS. 1 through 3. Such embodiments also include marking logic 180, as discussed above, such that the sequencer 420 for a speculative thread includes logic to mark the instruction information for such thread as "speculative." One skilled in the art will recognize that other processing systems and multithreading environments can also be utilized to implement the functionality described below.

FIG. 5 illustrates a method 500 for generating instructions to facilitate multithreading for speculative prefetch or pre-build of instruction information, either in an instruction cache or a trace cache, respectively. For at least one embodiment of the method 500, instructions are generated to reduce instruction fetch latency in a single-threaded application through the use of one or more overlapping speculative threads. The method 500 thus facilitates the parallel pre-execution of a portion of an application's code through the use of the "simultaneous" speculative threads. As used herein, the term "simultaneous" is intended to indicate that at least a portion of the helper thread instructions are executed during execution of the main thread.

FIG. 5 illustrates that the method 500 includes identification 510 of one or more code regions that are likely to incur at least a threshold quantity of performance loss due to instruction or trace cache misses during execution of an original program (sometimes referred to herein as the "main thread"). The original program may be in any format, including high-level source code or binary code (such as binary file 540). For at least one embodiment, performance loss is measured in terms of instructions per cycle. The amount of performance loss that satisfies the threshold to qualify as "significant," and thus be identified at block 510, may be determined based on programming considerations.

For embodiments that utilize a blocking instruction cache, blocking execution instruction cache or blocking trace cache, performance loss may be approximated to be proportional to the number of cache misses indicated in a profile. For non-blocking schemes, cache misses may not be an accurate metric to determine performance loss, and other metrics may therefore be utilized.

For at least one embodiment, identification 510 includes profile analysis to determine those code regions indicating high performance loss due to instruction cache, execution instruction cache or trace cache miss rates during execution. Block 510 is denoted with dotted lines in FIG. 5 to indicate that the analysis may optionally be performed or supported in hardware. That is, for at least one other embodiment, the identification 510 of code regions expected to incur a high miss rate in the instruction cache, trace cache or execution instruction cache may be determined at run-time as a form of hardware-based performance monitoring. One skilled in the art will recognize that any of many approaches, including profile-guided analysis and hardware performance monitoring structures, may be utilized to identify 510 appropriate code regions.

At block 520, the method 500 provides for identification 520 of spawning pairs that each includes a spawn point and a target point. In contrast to some types of traditional speculative multithreading techniques, which spawn speculative threads based on known control dependent structures such as calls or loops, at least one embodiment of the method 500 of FIG. 5 determines spawn point and target points based on control independency. In such embodiment, target points are identified to be control-quasi-independent points ("CQIP") relative to the spawn point.

At block 520, the method 500 evaluates pairs of basic blocks and identifies those that are candidates for a spawning pair. As used herein, the term "spawning pair" refers to a pair of instructions associated with the source program. One of the instructions is a spawn point, which is an instruction within a first basic block. For at least one embodiment, the spawn point is the first instruction of the first basic block.

The other instruction is a target point. For at least one embodiment, the target point is, more specifically, a control quasi-independent point ("CQIP"). The CQIP is an instruction within a second basic block. For at least one embodiment, the CQIP is the first instruction of the second basic block. A spawn point is the instruction in the source program that, when reached, will activate creation of a speculative thread at the CQIP, where the speculative thread will start its execution.

The method 500 identifies 520 and selects 525 one or more thread spawning pairs based on an analysis of control independence, in an effort to achieve speculative parallelization with minimal misspeculation in relation to control flow. During the identification 520, a control flow graph (CFG) may be generated to represent flow of control among the basic blocks associated with the application. Each node of the CFG may represent a basic block of the application, while edges between nodes of the CFG represent possible control flows among the basic blocks. For at least one embodiment, edges of the CFG may be weighted with the frequency that the corresponding control flow has been followed (as reflected, for instance, in an edge profile) during execution.

For at least one embodiment, candidate basic blocks are identified 520 as potential spawning pairs based on their associated reaching probabilities. Accordingly, the method 500, during identification 520 of potential thread spawning points, may compute an approximated reaching probability. As used herein the "reaching probability" is the probability that a second basic block will be reached after execution of a first basic block, without revisiting the first basic block. That is, the method 500 approximates the probability that a second basic block will be reached during execution of the source program, if a first basic block is executed.

Using the control flow graph (CFG) as an input, the approximated reaching probability for a potential spawning pair may be calculated as the sum of the frequencies for all the various sequences of basic blocks that exist from the source node to the destination node. In order to simplify the computation, a constraint may be imposed such that the source and destination nodes may only appear once in the sequence of nodes as the first and last nodes, respectively, and may not appear again as intermediate nodes. Those spawn pairs having at least a threshold approximated reaching probability are identified 520 as candidates.

At least one embodiment of reaching probability computation utilizes the CFG as an input and generates a reaching probability matrix as an output. As stated above, as used herein the "reaching probability" is the probability that a second basic block will be reached after execution of a first basic block, without revisiting the first basic block. For at least one embodiment, the computed approximated reaching probabilities are stored in a two-dimensional square matrix that has as many rows and columns as nodes in the CFG. Each element of the matrix represents the probability to execute the basic block represented by the column after execution of the basic block represented by the row.

For at least one embodiment, this probability is computed as the sum of the frequencies for all the various sequences of basic blocks that exist from the source node to the destination node. In order to simplify the computation, a constraint is imposed such that the source and destination nodes may only appear once in the sequence of nodes as the first and last nodes, respectively, and may not appear again as intermediate nodes. (For determining the probability of reaching a basic block again after it has been executed, the basic block will appear twice—as both the source and destination nodes). Other basic blocks are permitted to appear more than once in the sequence.

The reaching probability matrix is traversed to evaluate pairs of basic blocks and identify those that are candidates for a spawning pair. For each element in the reaching probability matrix, two basic blocks are represented. The first block includes a potential spawn point, and the second block includes a potential CQIP. An instruction (such as the first instruction) of the basic block for the row is the potential spawn point. An instruction (such as the first instruction) of the basic block for the column is the potential CQIP. Each element of the reaching probability matrix is evaluated, and those elements that satisfy certain selection criteria are chosen as candidates for spawning pairs. For at least one embodiment, the elements are evaluated to determine those pairs whose probability is higher than a certain predetermined threshold; that is, the probability to reach the control quasi-independent point after execution of the spawn point is higher than a given threshold. This criterion is designed to minimize spawning of speculative threads that are not executed. For at least one embodiment, a pair of basic blocks associated with an element of the reaching probability matrix is considered as a candidate for a spawning pair if its reaching probability is higher than 0.95

A second criterion for selection of a candidate spawning pair is the average number of instructions between the spawn point and the CQIP. Ideally, a minimum average number of instructions should exist between the spawning point and the CQIP in order to reduce the relative overhead of thread creation. If the distance is too small, the overhead of thread creation may outweigh the benefit of run-ahead execution because the speculative thread will not run far enough ahead. For at least one embodiment, a pair of basic blocks associated with an element of the reaching probability matrix is considered as a candidate for a spawning pair if the average number of instructions between them is greater than 32 instructions.

Distance between the basic blocks may be additionally stored in the matrix and considered in the identification of spawning pair candidates. For at least one embodiment, this additional information may be calculated during profile analysis and included in each element of the reaching probability matrix. The average may be calculated as the sum of the number of instructions executed by each sequence of basic blocks, multiplied by their frequency.

The spawning pair candidates are evaluated based on analysis of one or more selected metrics. These metrics may be prioritized. Based on the evaluation of the candidate spawning pairs in relation to the prioritized metrics, one or more spawning pairs are selected 525.

The metrics utilized to evaluate and select 525 spawning pair candidates may include the minimum average distance between the basic blocks of the potential spawning pair (described above), as well as an evaluation of mispredicted branches, load misses and/or instruction cache misses. The metrics may also include additional considerations. One such additional consideration is the maximum average distance between the basic blocks of the potential spawning pair. It should be noted that there are also potential performance penalties involved with having the average number of instructions between the spawn point and CQIP be too large. Accordingly, the selection of spawning pairs may also impose a maximum average distance.

Another additional consideration is the number of dependent instructions that the speculative thread includes in relation to the application code between the spawning point and the CQIP. Preferably, the average number of speculative thread instructions dependent on values generated by a previous thread (also referred to as "live-ins") should be relatively low. A smaller number of dependent instructions allow for more timely computation of the live-in values for the speculative thread.

In addition, for selected embodiments it is preferable that a relatively high number of the live-in values for the speculative thread are value-predictable. For those embodiments that use value prediction to provide for calculation of live-in values (discussed further below), value-predictability of the live-in values facilitates faster communication of live-in values, thus minimizing overhead of spawning while also allowing correctness and accuracy of speculative thread computation.

It is possible that the candidate spawning pairs identified at block 520 may include several good candidates for CQIP's associated with a given spawn point. That is, for a given row of the reaching probability matrix, more than one element may be selected as a candidate spawning pair. In such case, at least one embodiment of the metrics evaluation at block 525 selects a spawning pair that is determined to contain the "best" CQIP for the spawn point. That is, for at least one embodiment, for a given spawn point a speculative thread will be spawned at only one CQIP. In order to choose the "best" CQIP for a given spawn point, the potential CQIP's identified at block 520 are prioritized according to the expected benefit.

The candidate spawning pairs identified at block 520 are thus evaluated according to selected metrics in order to select 525 one or more spawning pairs. One additional metric that may be used during selection 525 is that the spawning pair should encompass a region of the main thread code that has been identified 510 as potentially incurring a significant level of performance loss due to cache misses in the instruction cache, execution instruction cache or trace cache. That is, the target point of the selected pair is associated with a point in the main thread code that is expected to incur at least a threshold quantity of performance loss. The metrics, for spawning pair evaluation, discussed herein may be used alone or in combination with one or more of any of the metrics described herein.

It should be noted that the order of blocks 510 and 520 should not be taken to be limiting. Indeed, identification 510 of code regions may occur after, or concurrently with, identification of candidate spawning pairs.

At block 530, instructions are generated such that, when a processor executes the instructions, a speculative thread is spawned and speculatively executes a selected portion of the application's code. Accordingly, the instructions generated at block 530 provide for speculative pre-execution, via a run-ahead helper thread, of a portion of the main thread code that begins at the target point (which is, for at least one embodiment, a CQIP).

The instructions generated at block 530 provide for spawning of a helper thread, in a free thread context, when the main thread hits the spawning point. At that time, the helper thread is spawned to begin execution at the target point (except that execution starts at the precomputation slice, if such a slice is present—see discussion regarding generation of slice instructions, below). As a result of helper thread execution, instruction information is prefetched into the execution instruction cache (such as 224 in FIG. 2) or, for systems that utilize a trace cache (such as 324 in FIG. 3), instruction information is pre-built into traces in the trace cache. In each case, and also in the case that neither an execution instruction cache 224 nor trace cache 324 is present, execution of a helper thread can warm up an instruction cache (such as 244 in FIGS. 2 and 3). When the main thread reaches the target point, it may utilize the speculative micro-architectural state (namely, the contents of the instruction cache, the execution instruction cache or trace cache) pre-computed by the helper thread.

FIG. 5 illustrates that the method generates an enhanced binary file 550 at block 530. The enhanced binary file 550 includes the binary code 540 for the original single-threaded application, as well as additional instructions. A trigger instruction to cause the speculative thread to be spawned is inserted into the enhanced binary file 550 at the spawn point (s) selected at block 525. The trigger instruction can be a conventional instruction in the existing instruction set of a processor, denoted with special marks (or "hints"), such as a special offset (or immediate) value for the NOP instruction, assuming that a particular processing system will recognize the hint as a fork or spawn instruction. Alternatively, the trigger instruction can be a special dedicated instruction such as a fork or spawn instruction.

In addition, the instructions to be performed by the speculative thread are included in the enhanced binary file 550. These instructions may include instructions added to the original code binary file 540 for live-in calculation, and also some instructions already in the original code binary file 540, beginning at the CQIP, that the speculative thread is to execute. That is, regarding the speculative-thread instructions generated and placed 530 in the enhanced binary file 550, two groups of instructions may be distinguished for each spawning pair, if the speculative thread is to perform speculative precomputation for live-in values. In contrast, for a speculative thread that is to use hardware value prediction for its live-in values, only the latter group of instructions described immediately below appears in the enhanced binary file 550.

The first group of instructions is generated and placed 530 into the enhanced binary code file 550 in order to provide for the speculative thread's calculation of live-in values. For at least one embodiment, the instructions to be performed by the speculative thread to pre-compute live-in values are appended at the end of the file 550, after those instructions associated with the original code binary file 540.

Predicting thread input values allows the processor to execute speculative threads as if they were independent. For an embodiment wherein prediction of input values for a helper thread is provided via precomputation, a "slice" of instructions from the application's code that may be used for speculative precomputation of one or more live-in values is identified at block 530. For at least one embodiment, a set of instructions, called a slice, is computed at block 530 to include only those instructions identified from the original application code that are necessary to compute the live-in value. The slice therefore is a subset of instructions from the original application code. The slice is computed by following the dependence edges backward from the instruction including the live-in value until all instructions necessary for calculation of the live-in value have been identified. A copy of the identified slice instructions is generated for insertion into the enhanced binary file 550. Speculative precomputation, via execution of the precomputation slice instructions, can be performed at the beginning of the speculative thread execution in an otherwise idle thread context, providing the advantage of minimizing misspeculations of live-in values without requiring additional value prediction hardware support.

At least one embodiment of block 530 generates instructions to trigger value prediction rather than, or in addition to, generating a precomputation slice. (Of course, in some embodiments value prediction may be triggered by the spawn instruction itself, in which case no additional instructions need be generated at block 530). Any known manner of value prediction, including hardware value prediction, may be implemented. For example, instructions may be generated 530 such that the live-in register values of the spawned thread are predicted to be the same as those of the spawning thread at spawn time.

Regardless of whether the speculative thread utilizes value prediction (no slice instructions in the enhanced binary file 550) or speculative precomputation (slice instructions in the enhanced binary file 550), or a combination of both approaches, the speculative thread is associated with the second group of instructions alluded to above. The second set of instructions are instructions that already exist in the original code binary file 540. The subset of such instructions that are associated with the speculative thread are those instructions (or at least a subset of them) in the original code binary file 540 starting at the CQIP. For speculative threads that utilize speculative pre-computation for live-ins, the precomputation slice (which may be appended at the end of the enhanced binary file) terminates with a branch to the corresponding CQIP, which causes the speculative thread to begin executing the application code instructions at the CQIP. For speculative threads that utilize value prediction for live-in values, the spawnee thread begins execution of the application code instructions beginning at the CQIP.

In an alternative embodiment, the enhanced binary file 550 includes, for the speculative thread, a copy of the relevant subset of instructions from the original application, rather than providing for the speculative thread to branch to the CQIP instruction of the original code. It should be noted that a copy of a subset of the main thread instructions may be desirable to facilitate porous pre-execution (discussed below in connection with block 615 of FIG. 6) such that only a subset of the main thread instructions after the CQIP need be executed by a speculative helper thread. The instructions of the subset resolve branches after the target and correctly follow the control flow and perform explicit instruction prefetches for the basic blocks that are encountered.

The instructions generated at block 530 thus facilitate speculative helper thread prefetch of instruction data, but without a view towards maintaining an architectural state that will be utilized by the main thread. Accordingly, there is no need to equip the processor with sophisticated checker/commit logic to facilitate the main thread's reuse of speculatively precomputed architectural states.

Figure 11:
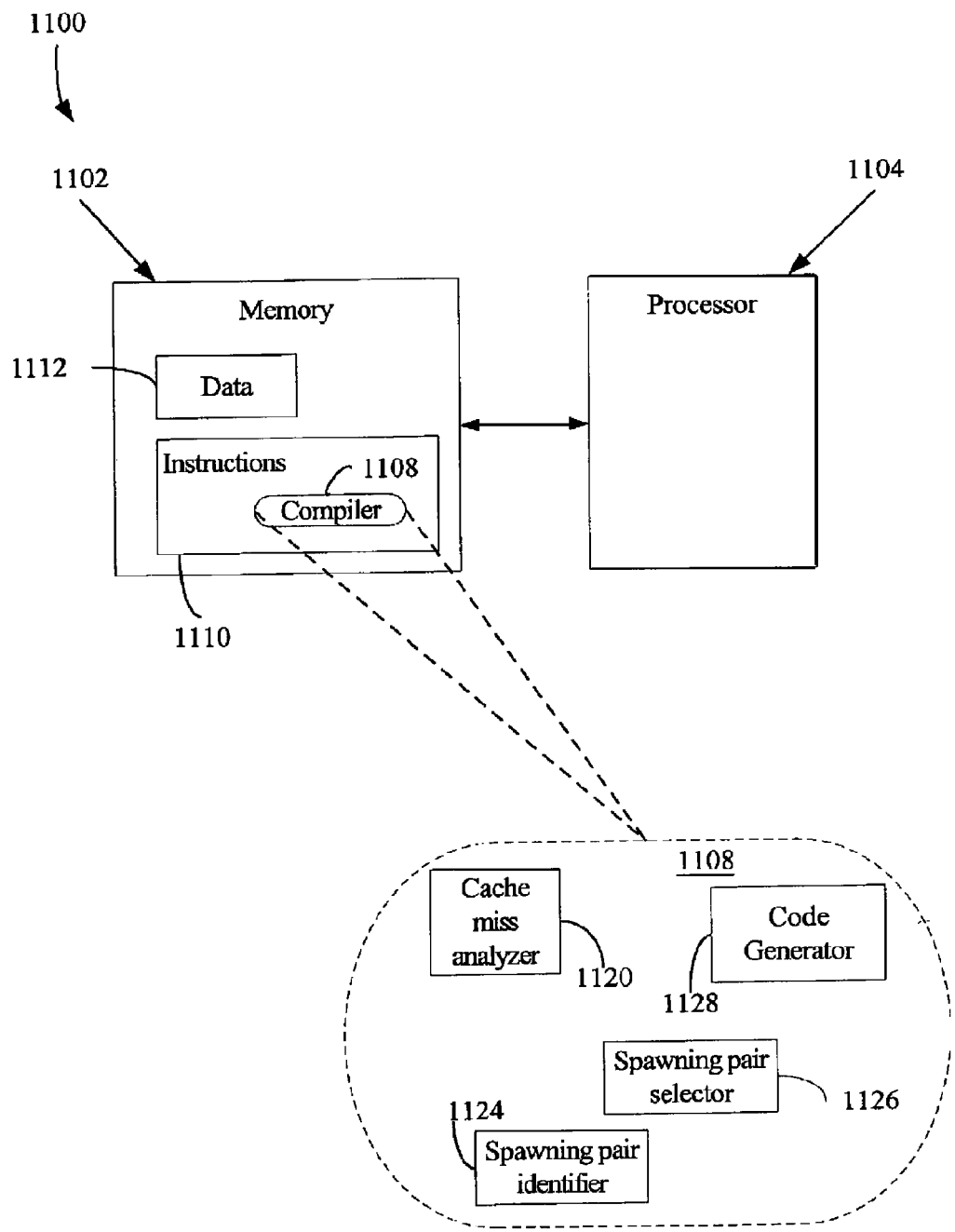
FIG. 11 is a block diagram of at least one embodiment of a processing system capable of performing at least one embodiment of control-quasi-independent-points guided speculative multithreading for instruction cache pre-fetch and/or trace cache pre-build.

For at least one embodiment, method 500 discussed above is performed by a compiler (such as, for example, 1108 in FIG. 11). In such embodiment, the method 500 represents an automated process in which a compiler identifies a spawn point and an associated target point for a speculative thread and generates instructions to modify a main thread binary by at least embedding a trigger instruction at the spawn point in the main thread binary. The compiler may also generate pre-computation instructions for live-in values for the speculative thread and may incorporate them (such as, for example, by appending) into an enhanced binary file 550. One skilled in the art will recognize that, in alternative embodiments, the method 500 may be performed manually such that one or more of 1) identifying spawning pairs 520 and/or selecting one or more spawning pair(s) 525, 2) modification of the main thread binary 540, and 3) generation of live-in precomputation instructions may be performed interactively with human intervention.

FIGS. 6, 7, 8 and 9 are flowcharts illustrating a method 600 of performing speculative prefetch of instruction information via speculative helper threads. As used herein, the phrase "prefetch of instruction information" is intended to include pre-build of traces. The method may be performed, for at least one embodiment, by a processor (such as processor 104 illustrated in FIGS. 1-4) that is executing code (such as enhanced binary code 550 shown in FIG. 5) generated in accordance with the method 500 illustrated in FIG. 5. At least one embodiment of the processor provides for, during execution of the method 600, execution of multiple threads $T_0$, $T_1$ simultaneously. At least one embodiment of the processor further provides a logically independent sequencer (such as sequencer 420 illustrated in FIGS. 1 and 4) for each of the multiple threads. In such processor, each independent sequencer generates the next instruction address for its respective thread (via, for instance, fetch from an instruction cache 244). For at least one embodiment, the sequencer may be one of multiple logical sequencers supported by a single physical fetch unit (such as, for example, fetch-decode unit 222 illustrated in FIG. 1).

Figure 6:
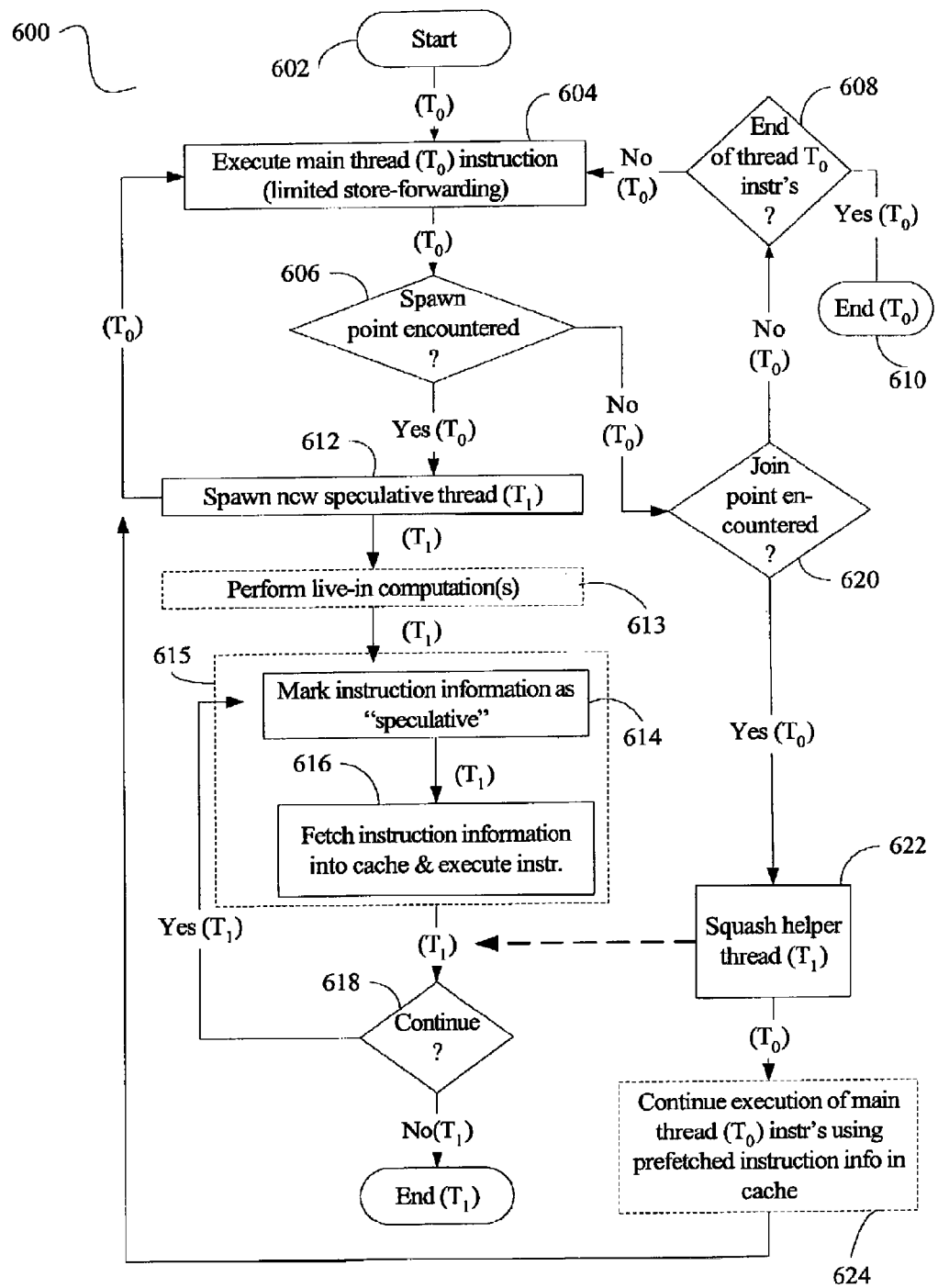
FIG. 6 is a flowchart illustrating at least one embodiment of a method of performing speculative prefetch of instruction information.

FIG. 6 illustrates that a speculative thread, referred to as a spawnee thread, executes instructions that are ahead of the code being executed by the thread that performed the spawn. The thread that performed the spawn is referred to as the spawner thread. For at least one embodiment, the spawnee thread is a thread that is executed by a second logical processor on the same physical SMT processor as the spawner thread, which executes on the first logical processor. One skilled in the art will recognize that the method 600 may be utilized in any multithreading approach, including SMT, CMP multithreading or other multiprocessor multithreading, or any other known multithreading approach that may encounter idle thread contexts.

In FIGS. 6, 7, 8 and 9 the flow of control associated with each of the multiple threads is indicated by the notations $T_0$ and $T_1$ on the edges between the blocks of the flowcharts. For simplicity of illustration, only two threads ($T_0$, $T_1$) are shown. One skilled in the art will recognize, however, that multiple threads may be spawned from a non-speculative thread. Also, in at least one embodiment, a speculative thread may spawn one or more additional speculative successor threads.

FIG. 6 illustrates, generally, that when a spawning point is encountered during main thread ($T_0$) execution, a speculative thread ($T_1$) is spawned to begin execution at its corresponding target point (which may be a CQIP). The speculative thread ($T_1$) speculatively executes the main thread ($T_0$) code, beginning at the target, to prefetch instruction information into a cache (such as 225, FIG. 1).

FIG. 6 illustrates, more specifically, that processing begins at 602, where the main thread $T_0$ begins execution. An instruction for the thread $T_0$ is executed at block 604. If a trigger instruction associated with a spawn point is encountered 606, then processing continues to block 612. Otherwise, the thread $T_0$ continues execution at block 620. At block 620 it is determined whether a join point has been encountered in the thread $T_0$. When the spawner thread $T_0$ reaches a target point (which may be a CQIP) of an active, more speculative thread, then we say that a join point has been encountered. If neither a trigger instruction nor join point is encountered, then the thread $T_0$ continues to execute instructions 604 until it reaches 608 the end of its instructions. When main thread $T_0$ reaches 608 the end of its instructions, processing for main thread $T_0$ ends at block 610.

If a trigger instruction is detected at block 606, a spawn point has been encountered (assuming that the instructions being executed by the main thread $T_0$ have been modified to embed a trigger instruction at the spawn point, as is discussed above in connection with block 530 of FIG. 5). If a spawn point is encountered at block 606, then a speculative thread $T_1$ is spawned in a free thread context at block 612.

At block 613, live-in computation may be optionally performed. The optional nature of live-in computation 613 is denoted by the broken line for block 613 in FIG. 6. Computation of live-in values may be performed to address data dependencies of the helper thread $T_1$. The computation 613 is optional at least in an embodiment wherein live-in values are predicted using a value prediction approach. As is discussed above, live-in precomputation slice instructions are not placed 530 in the enhanced binary file 550 for speculative threads that use value prediction. Instead, specialized value prediction hardware may be used for value prediction. The value prediction hardware may be fired by the spawn instruction. When the processor executes a spawn instruction, the hardware initializes the speculative thread registers with the predicted live-in values.

For at least one other embodiment, however, live-in values may be speculatively pre-computed 613 by slice instructions based on backward dependency analysis. If live-in computation 613 is performed, speculative execution of the helper thread continues at block 615 after the live-in value(s) have been computed.

Figure 7:
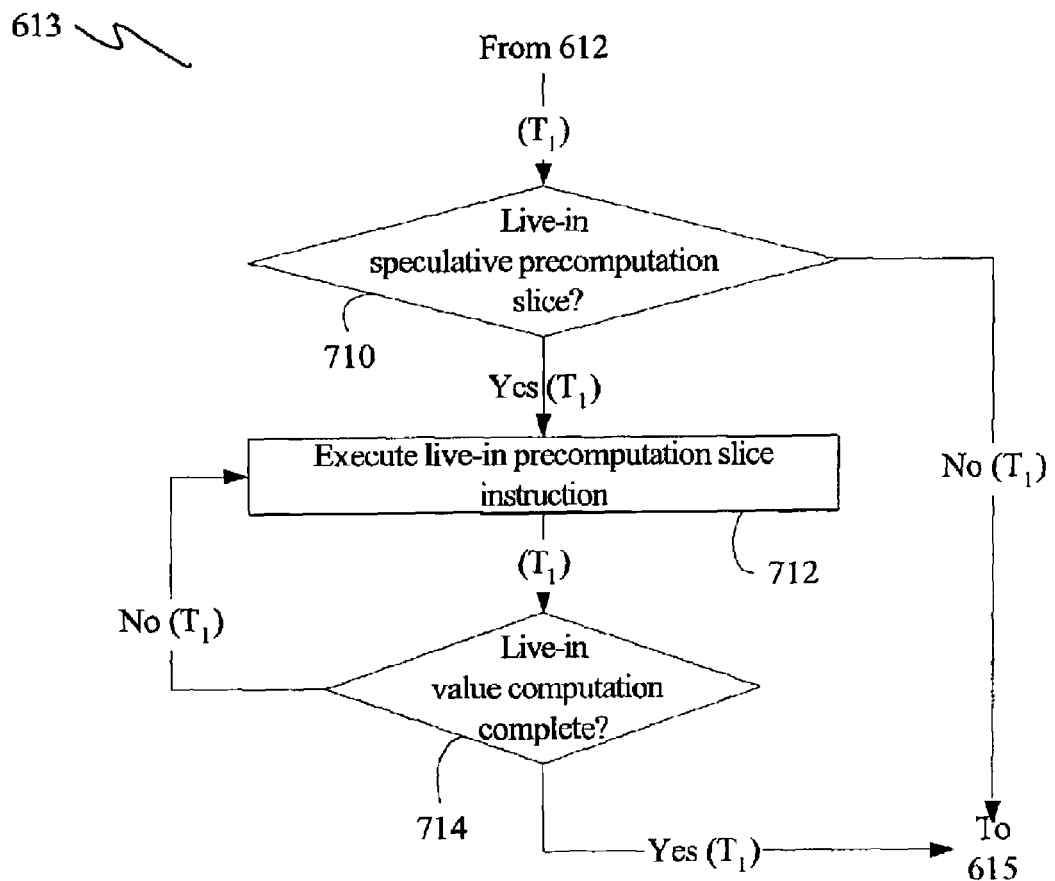
FIG. 7 is a flowchart illustrating at least one embodiment of a method of speculative precomputation of one or more live-in values for a helper thread.

Brief reference to FIG. 7 provides a more detailed flowchart of live-in computation 613. FIG. 7 illustrates that, even if the method 600 is designed to provide for precomputation 613 of live-in values, it is nonetheless desirable to check 710 to determine that a precomputation slice is present.

If no slice is detected 710, then presumably no precomputation of live-in values is needed for the helper thread $T_1$. However, it will often be the case that helper thread $T_1$ should compute live-in values prior to beginning execution at the target. In such case, a precomputation slice is present in the instructions for the helper thread $T_1$. If the speculative thread T1 at block 710 encounters slice instructions, then processing continues at block 712. If not, then processing continues at 615 (FIG. 6).

At block 712, slice instructions for speculative precomputation are executed until the speculative precomputation of the live-in value is complete 714. At block 714 it is determined whether live-in computation is complete. If so, processing proceeds to block 615 (FIG. 6).

Returning to FIG. 6, it can be seen that, while the helper thread $T_1$ is executing its instructions, $T_0$ simultaneously continues execution. After spawning the speculative thread $T_1$ at block 612, the spawner thread $T_0$ continues to execute 604 its instructions. FIG. 6 illustrates that, while the speculative thread $T_1$ executes its instructions, the spawner thread $T_0$ continues execution 604 of its instructions until another spawn point is encountered 606, a join point is encountered 620, or the instruction stream ends 608.

Accordingly, instructions of the spawner thread $T_0$ and the spawnee thread $T_1$ execute concurrently during speculative precomputation, if a slice exists in the enhanced binary code 550 (FIG. 5). When live-in computation 613 is determined complete 714 (FIG. 7), or if no slice instructions for speculative precomputation are available to the speculative thread $T_1$ (as determined at block 710 of FIG. 7), then processing continues at 615.

FIG. 6 illustrates that, at block 615, the helper thread $T_1$ executes instructions from the original code. At the first iteration of block 615, the target instruction is executed. The execution 615 of helper thread $T_1$ instructions is performed concurrently with the execution of the main thread $T_0$ code until a terminating condition is reached.

FIG. 6 illustrates that execution 615 of instructions includes marking 614 instruction information for the instructions as originating in a speculative thread and further includes fetch 616 of instruction information into the I-cache and/or trace cache and execution of the instruction. The fetch 616 performed by the helper thread $T_1$ effectively and implicitly becomes a "pre-fetch" for the non-speculative thread ($T_0$). In processing systems where a trace cache 324 and/or execution instruction cache 224 are used, the fetch 616 for the helper thread $T_1$ effectively prebuilds and/or prefetches instruction information for the non-speculative thread $T_0$ into the relevant cache(s). In other words, the side effect of helper thread execution (including fetching) is that it effects instruction prefetching and/or trace cache prebuilding for the non-speculative thread. As used herein, the "fetch" of "instruction information" thus includes trace cache pre-build.

As used herein, the term "cache" is used as a general term to encompass both an execution instruction cache and a trace cache. For a system, such as the system 200 illustrated in FIG. 2, that utilizes an execution instruction cache 224 to store decoded instructions, the term "cache" as used in block 615 is meant to refer to such an execution instruction cache 224. Alternatively, for a system, such as the system 300 illustrated in FIG. 3, that builds and stores traces in a trace cache 324, the term "cache" is used in block 615 to refer to such a trace cache 324. One skilled in the art will recognize that, if a miss occurs in the trace cache, then a fetch from an instruction cache, such as 244, may be necessary in order to prebuild traces in the trace cache 324. As a result, as mentioned above, pre-build of traces may effectively warm up the I-cache for the non-speculative thread.

To mark 614 instructions for the speculative thread, a mechanism is invoked to distinguish instructions from speculative and non-speculative threads. While a specific embodiment of such a mechanism is discussed below, one skilled in the art will recognize that it is just one of many potential embodiments. The specific embodiment of a mechanism to distinguish speculative and non-speculative instructions may be chosen based on numerous factors, including the underlying architectural and micro-architectural design features of the processor that is performing the method 600.

Reference is made to FIGS. 1, 4 and 6 for a discussion of at least one embodiment of a hardware mechanism for distinguishing speculative from non-speculative instructions. Generally, marking logic 180 for each thread generates an indicator for each instruction address that it fetches, the indicator being indicative of whether or not the instruction is associated with a speculative thread. Accordingly, for at least one embodiment of the method 600, during marking 614 of instruction information for speculative thread $T_1$, each instruction is marked with a speculation identifier. For at least one embodiment, the speculation identifier is a single bit that is associated with the thread id for the thread. For at least one embodiment, marking logic 180 is included within a sequencer 420. However, one skilled in the art will recognize that the marking logic 180 may be implemented as stand-alone logic or may be incorporated into any of many other structures such as, for instance, MOB 223 (FIGS. 2, 3) or memory system 240.

If a sequencer 420 is fetching instruction information for a non-speculative thread (such as main thread $T_0$ in FIG. 6), then its marking logic 180 generates a "non-speculative" value for the speculation indicator and includes this value as part of the information that the sequencer 420 provides to the cache. Conversely, if a sequencer 420 is fetching instruction information for a speculative thread (such as helper thread $T_1$ in FIG. 6), then at block 614 the marking logic 180 generates a "speculative" value for the speculation indicator, and the sequencer 420 includes this value in the information that it provides 616 to the cache. As is described below, the speculation identifier is used by some of the instruction-handling structures (such as a reorder buffer, memory order buffer or memory system) in the processor in order to provide for orderly and accurate processing related to instruction prefetch and trace cache prebuild.

At block 616, the instruction information, which has been marked 614 to indicate that it concerns an instruction from a speculative thread, is fetched into the appropriate cache (assuming that it is not already in the cache). The instruction is then executed.

For a processor that utilizes an execution instruction cache to store decoded instructions, the instruction information (decoded instruction and associated thread id and speculation identifier) is fetched 616 into the execution instruction cache (such as, for example, 224 in FIG. 2). For a processor that utilizes a trace cache to store traces, a trace is pre-built 616 in the trace cache (such as, for example, 324 in FIG. 3). For at least one embodiment, such as where a common fragment of traces is shared between traces represented hierarchically, the trace reflects those instructions (and associated thread id and speculation identifier for each instruction in the trace), in program order, that are predicted to be executed by the processor. For at least one other embodiment, such as where the trace is an atomic unity, a single thread id and speculation identifier is associated with the trace and need not be associated with each instruction in the trace. As long as the live-in values utilized by the helper thread T1 are accurate, the speculative preexecution 615 of instructions will correctly compute outcomes for branches (both direction and target, if taken) and trace construction will be accurate.

However, it is important to note that, even if live-in values utilized by the helper thread $T_1$ are completely accurate (i.e., they match the values generated by main thread $T_0$ during normal execution), trace construction and instruction prefetch are nonetheless speculative for an embodiment that utilizes control-quasi-independent-points guided analysis to select a target point for a given spawn point. That is, for any spawning pair selected according to the CQIP-guided analysis discussed above, the CQIP is only quasi-independent and is not absolutely control-independent.

Accordingly, one skilled in the art will recognize that other methods and/or additional computations may be employed to select spawning pairs. For instance, additional computations to enhance accuracy of target selection, including expected path length, path length variance, expected footprint, and posteriori probability, may be employed in addition to the CQIP-guided analysis discussed above. Alternatively, for instance, spawning pairs may be selected without using the CQIP-guided analysis discussed above. Spawning pairs may be selected on some other criteria. Such approach may be utilized when post-selection mechanisms are used to determine accuracy of target selection. For instance, a result determined via execution of a precomputation slice may be utilized to determine whether the prefetching should proceed. If the result indicates that a branch is predicted to be taken by the main thread, and that the branch would take control flow of the main thread around the target point, then the speculative prefetch thread may be abandoned.

When the instruction for helper thread $T_1$ is executed at block 616, certain constraints are imposed for Store instructions. That is, data for Store instructions from the speculative thread $T_1$ are not committed to memory and Store data from such instructions is not made available to Load instructions from the non-speculative thread. This constraint is imposed because, in the enhanced binary file 550 the helper thread $T_1$ can directly and speculative execute instructions from the main thread code, without modification. Accordingly, Store instructions could be present. On the one hand, it is desirable for a run-ahead helper thread T1 to prefetch instruction information by fetching and executing the Store instruction, if instruction information for the Store is not already in the cache, in order to warm up the cache for the main thread. On the other hand, permitting the data associated with a Store instruction to be committed to memory or bypassed to the main thread may interfere with operation of the main thread. Therefore, at block 616 it is desirable to fetch the instruction information for a Store instruction into the cache (224 or 324, and/or 244), but to prevent the Store data from being committed to memory or used by Load instructions in the non-speculative thread. Preventing the Store data from being to committed to memory is referred to herein as "store blocking." Preventing the Store data from being bypassed to Load instructions in the non-speculative thread is referred to herein as "dependence blocking."

Depending on the specific design of the processor performing the method 600, this constraint on execution 616 of speculative Store instructions may be imposed via any of several hardware mechanisms. In one approach, the Store data is tagged as being speculative when it is stored in a cache line of a data cache (such as, for example, data cache 242 in FIGS. 2 and 3). The memory system (such as 240 in FIGS. 2 and 3) blocks such flagged data from being committed to memory (such as 102 in FIGS. 2 and 3). For at least one embodiment, such store blocking functionality is performed by store blocker logic (such as 246 in FIG. 1) associated with the memory system. In at least one embodiment, the store blocker logic also prevents the Store data from being used (e.g., through bypass to Load instructions from the non-speculative thread).

In another approach, the data associated with a Store instruction for a speculative thread may be flagged as "speculative" in a memory order buffer (such as MOB 223 in FIGS. 2 and 3). Dependence blocker logic (such as 236 in FIG. 1), which may be implemented as part of the MOB 223, prevents such flagged data from being bypassed to a Load instruction from the non-speculative thread. For at least one embodiment, the dependence blocker logic also prevents the flagged speculative Store data from being written to memory.

After prefetching and executing 616 the instruction, the speculative thread $T_1$ checks for a terminating condition at block 618. The check 618 evaluates to "true" at least when the spawnee thread $T_1$ has encountered the end of its instructions. As long as no terminating condition exists, and as long as helper thread $T_1$ has not been squashed by a less speculative thread (such as main thread $T_0$), the helper thread $T_1$ proceeds to block 615.

At block 615, the helper thread $T_1$ executes 615 the next instruction in its instruction stream. For some embodiments, the helper thread $T_1$ is directed, via instructions in an enhanced binary file (such as, for example, 550 of FIG. 5) to simply execute the instructions of the main thread $T_0$, beginning at the target point and continuing until a terminating condition is reached. This manner of complete pre-execution 615 of the main thread $T_0$ instructions after the target, in the speculated program order, is referred to herein as high-fidelity pre-execution or "hi-fi pre-execution." The traces pre-built during hi-fi pre-execution are expected to have a high degree of accuracy in that they are expected to reflect that the helper thread has accurately predicted and pre-built traces corresponding to the main thread's execution control path.

In an alternative embodiment, the helper thread only pre-executes 615 a selected subset of the main $T_0$ thread instructions. For instance, the helper thread $T_1$ may skip those instructions of which future branch instructions are independent. Such an approach is referred to herein as "porous pre-execution." That is, for the sake of prebuilding traces or for the sake of prefetching instructions, the minimum work a run-ahead speculative helper thread should perform is to pre-execute those instructions that affect the outcome of branches in future code sections and then fetch the instructions in the basic blocks associated with the branch outcome.

For at least one embodiment, the selection of which instructions to execute during porous pre-execution is performed by hardware (not shown) during the helper thread's T1 execution 615 of its instructions. Alternatively, data flow analysis to determine which instructions affect the outcome of future branches may be performed by software. For example, such data flow analysis may be performed during generation of the enhanced binary file (for instance, by block 530 of FIG. 5 during generation of enhanced binary code 550). In such case, instructions for the helper thread may be generated and appended to the main code binary, such that the helper thread instructions include only those instructions relevant to porous pre-execution. The helper thread instructions may include, for each branch resolved in the pre-execution, an instruction prefetch instruction (such as a counted prefetch instruction) to prefetch instructions at the target basic block (or aggregate of multiple blocks).

As used herein, a "counted prefetch instruction" is a prefetch instruction that includes an indication of the quantity of instructions to be prefetched. It may include two semantic parts: a beginning instruction address (to indicate where prefetch is to begin) and a quantity indicator. The quantity indicator may indicate the quantity of prefetch in terms of instructions, cache lines, or the like.

An alternative embodiment of porous pre-execution involves execution 615 of helper thread instructions, based on prediction, to skip certain branches (and associated basic blocks) during the pre-execution by the helper thread $T_1$. The prediction approach for porous pre-execution is useful, in certain cases, to enhance timeliness and spatial compactness of the helper thread's instruction execution. For at least one embodiment, the hardware can use branch prediction to further infer the number of basic blocks to prefetch. One manner of doing so is to inject counted instruction prefetch instructions.

Figure 10:
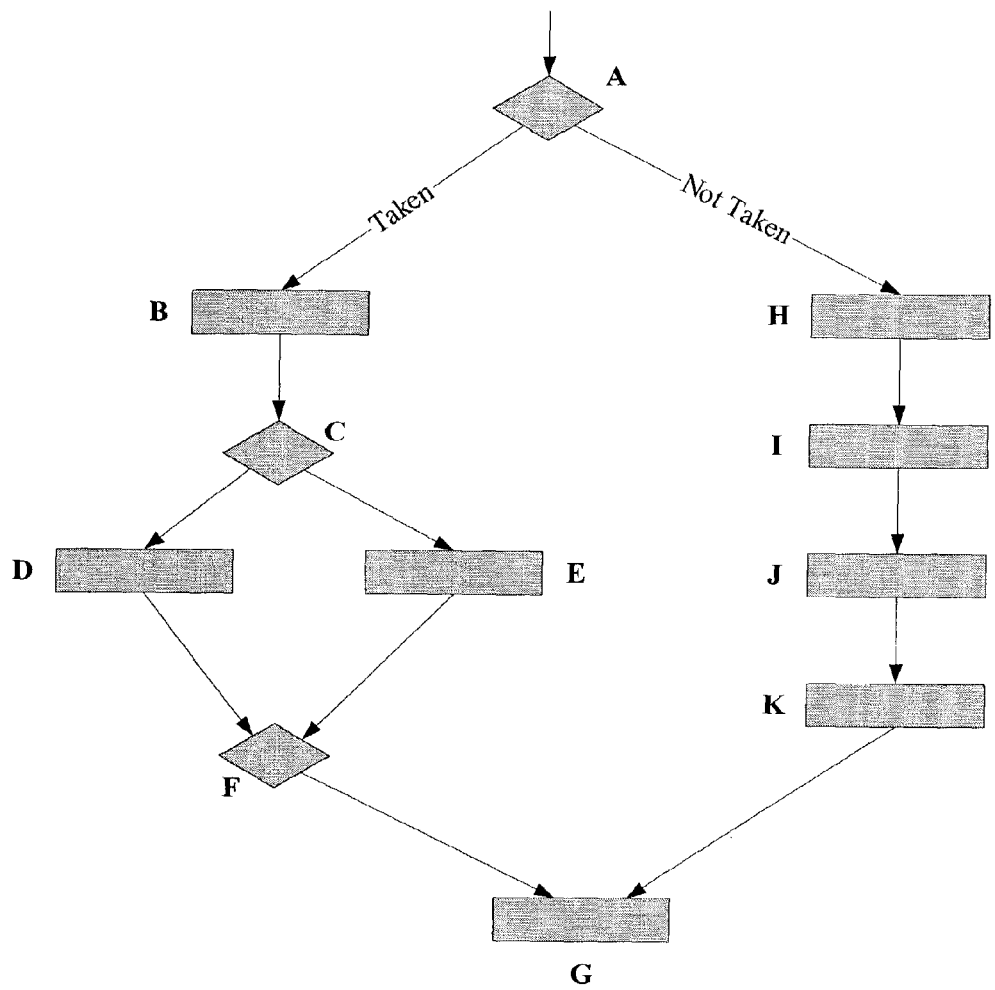
FIG. 10 is a block diagram illustrating a set of candidate instructions for porous pre-execution according to at least one embodiment.

Brief reference is made to FIG. 10 for an illustrative example of porous pre-execution. FIG. 10 illustrates a sample code excerpt of candidate instructions to be executed 615 by a speculative helper thread. The candidate instructions are represented as branch instructions A, C, F and basic blocks B, D, E, H, I, J, K, G. During porous pre-execution, the helper thread may follow certain control-independent points and pre-build traces only along high-probability fragments of the instruction path, leaving unbiased and/or hard-to-compute (due to timeliness) fragments of future control flow unconstructed and marked as "don't care" in the trace cache.

The code excerpt of FIG. 10 illustrates a hammock of control flow induced on a non-biased branch instruction C that also has a long dependency chain, which requires a relatively long resolution time. During porous pre-execution, it may be determined that branch instruction A is predicted to be taken but that branch C is either hard to compute, unbiased, or both. In such case, a partial, or "porous," trace is pre-built for ABC*FG, where * indicates an unconstructed portion of the trace. The skipped fragment (i.e., either D or E) may be built later via just-in-time demand-driven build (upon use by the non-speculative thread) or via refined (iterative) prebuild.

Returning to FIG. 6, one can see that a join point check is performed at block 620. The join point of a thread is the control quasi-independent point at which an on-going speculative thread began execution. It should be understood that multiple speculative threads may be active at one time, hence the terminology "more speculative." A "more speculative" thread is a thread that is a spawnee of the reference thread (in this case, thread $T_0$) and includes any subsequently-spawned speculative thread in the spawnee's spawning chain.

Thus, the join point check 620 evaluates to true when the thread $T_0$ reaches the CQIP (or other type of target point) at which any on-going speculative thread began execution. One skilled in the art will recognize that, if multiple speculative threads are simultaneously active, then any one of the multiple target points for the active speculative threads could be reached at block 620. For simplicity of illustration, FIG. 6 assumes that when $T_0$ hits a join point at bock 620, the join point is associated with $T_1$, the next thread in program order, which is the speculative thread whose CQIP has been reached by the non-speculative thread $T_0$.

Upon reaching a join point at block 620, processing for main thread $T_0$ proceeds to block 622. At block 622, helper thread $T_1$ is squashed, and main thread $T_0$ proceeds to block 624 to continue execution of its instructions. In an alternative embodiment, the helper thread $T_1$ may continue execution.

Execution 624 of instructions for main thread $T_0$ continues from the join point. As is stated above, the join point is also the CQIP where the helper thread began execution at the first iteration of block 615. Accordingly, the instructions following the CQIP have already been pre-executed by the helper thread $T_1$ and their instruction information should theoretically therefore be available in the cache for the main thread $T_0$ to use. In the case of a non-partitioned cache, such is truly the case. For example, consider processor that utilizes a non-partitioned execution instruction cache (such as execution instruction cache 224 in FIG. 2). Both the main thread context and the helper thread context may access the execution instruction cache during execution. Accordingly, the run-ahead helper thread has "warmed up" the execution instruction cache during its execution 615, 618, fetching into the execution instruction cache 224 instruction information that may be later accessed (or "reused") when the main thread $T_0$ begins executing the instructions 624 at the CQIP.

Figure 8:
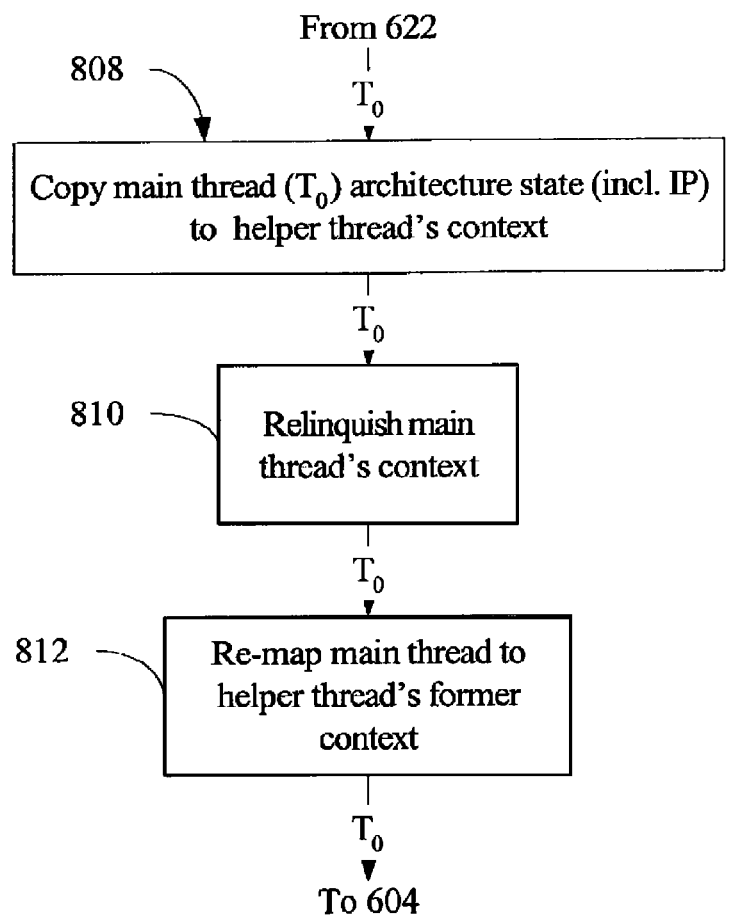
FIG. 8 is a flowchart illustrating at least one embodiment of a method of switching contexts to continue execution of a main thread using instruction information prefetched by a helper thread.

FIG. 8, which illustrates additional processing for selected embodiments of block 624, illustrates that a context switch may be performed to allow the main thread $T_0$ access to the appropriate section of a partitioned cache. That is, in some processing systems a cache, such as a trace cache or execution instruction cache, is partitioned so that each thread context can only access one specific section of the cache. In such case a non-speculative thread cannot access pre-built traces in the partition of the trace cache associated with a helper thread.

FIG. 8 illustrates that, in order to deal with a cache that is partitioned in this manner, a swap is accomplished so that the main thread swaps to the helper thread's former context, and then continues execution with access to the cache partition associated with the helper thread's former context. At block 808 the architecture state, including the instruction address pointer, for the main thread $T_0$ is transferred to the helper thread's context. For at least one embodiment, the architecture state transfer is implemented via explicitly copying the content of physical registers from one context to the other. For at least one other embodiment, the architecture state transfer is achieved via copying of a register renaming map rather than copying the contents of physical registers.

At block 810 the main thread's context is relinquished. At block 812, the main thread is re-mapped to the helper thread's former context. After such swap, non-speculative execution of the main thread's instructions continues at block 604, but in the helper thread's former context. As processing continues, the main thread $T_0$ now has access to the cache partition that the helper thread $T_1$ warmed up.

Figure 9:
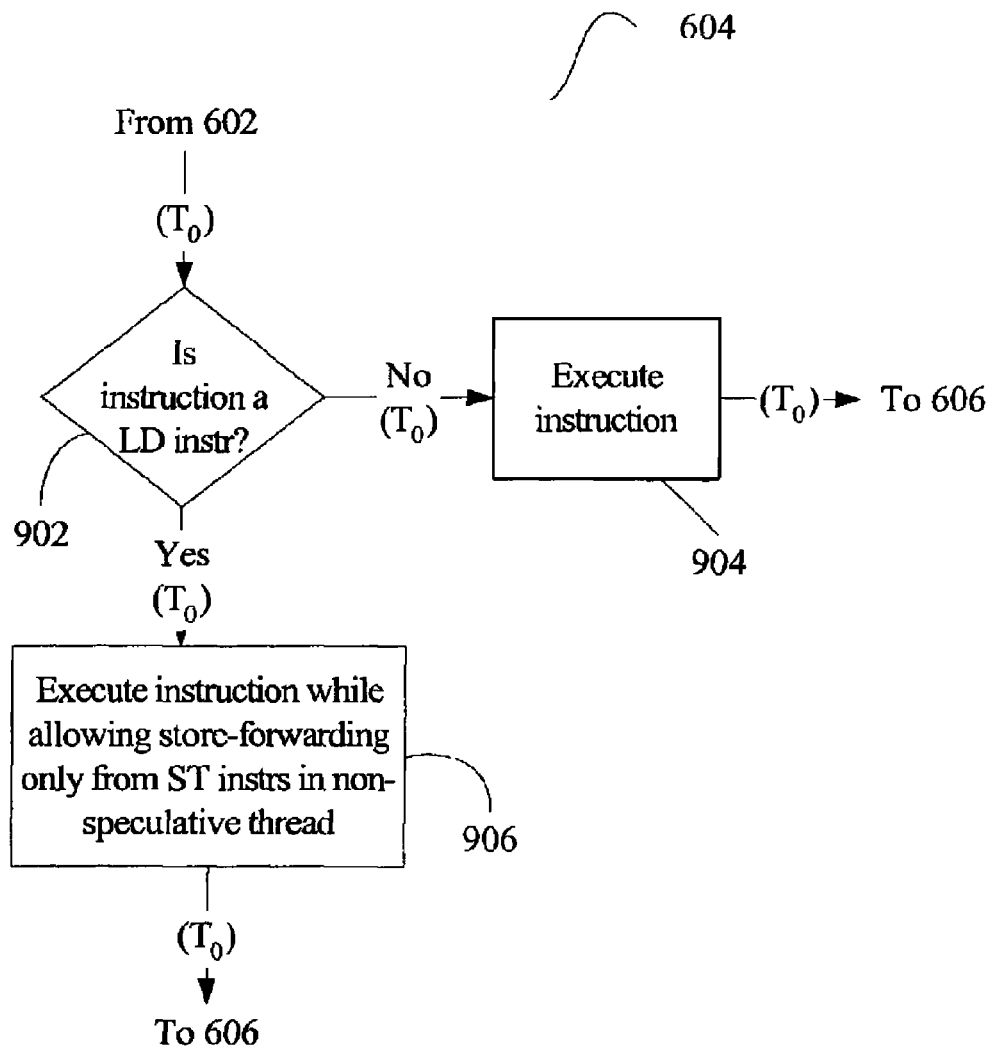
FIG. 9 is a flowchart illustrating at least one embodiment of a method of executing a main thread instruction with limited store forwarding.

FIG. 9 illustrates additional processing associated with at least one embodiment of block 604 (FIG. 6). The processing illustrated in FIG. 9 facilitates limited store forwarding to implement dependence blocking. As the main thread $T_0$ executes 604 a instruction, it determines 902 whether the instruction is a Load instruction. If not, the instruction is executed 904 normally.

If the main thread $T_0$ determines at block 902 that the current instruction is a Load instruction, then processing continues at block 906. At block 906, the main thread $T_0$ executes the instruction without utilizing any intermediate Store data associated with a Store instruction in a speculative thread. That is, ordinarily most processors allow for "store forwarding" of data from a Store instruction whose data has been placed into an intermediate buffer (but not yet committed to memory) to a Load instruction that needs the data as a source operand. However, such store forwarding is prohibited at block 906 if the uncommitted Store data is associated with a Store instruction in a speculative thread, such as helper thread $T_1$.

The processing of block 906 may rely upon an underlying hardware mechanism that recognizes, and acts upon, the speculation indicator and thread id discussed above. As is stated above, a processor that executes the enhanced binary code 550 generated as a result of the method 500 illustrated in FIG. 5 may include hardware to include a speculation indicator and thread id with the instruction information generated by the sequencer 420. The speculation indicator and thread id are included with instruction information provided to other hardware structures (besides an execution instruction cache or trace cache) such as a reorder buffer (i.e., 230 in FIGS. 2 and 3), a memory order buffer (i.e., 223 in FIGS. 2 and 3), or a memory system (i.e., 240 in FIGS. 1-3). Any structure, such as the reorder buffer, memory order buffer, or memory system 240, that accesses the instruction information may thus easily distinguish instructions in a non-speculative thread from those in a speculative thread.

For at least one embodiment, the uncommitted Store data is stored in a store request buffer in a memory order buffer, such as MOB 223 in FIGS. 2 and 3. Circuitry, such as dependence blocker logic (i.e., 236 in FIGS. 1-3), in the memory order buffer prevents the recognition of a dependency between the uncommitted Store data and a Load instruction from a non-speculative thread that needs the data, unless the uncommitted Store data is also from the non-speculative thread. Thus, the MOB 223 is prevented from identifying a dependency from a helper thread Store instruction to a Load instruction from a non-speculative thread.

For at least one embodiment, the dependence blocker logic effects this constraint by associating the speculation indicator and thread id with each Load or Store address in the load request buffers and store request buffers of the MOB. The MOB won't recognize a dependency for a non-speculative thread (as indicated by the speculation indicator) unless the thread id's of the Load and Store instructions match.

However, alternative embodiments do permit store forwarding of Load data to Store instructions with a different thread id, though they still constrain the forwarding of speculative thread Store data to Load instructions from a non-speculative thread. That is, depending on the microarchitectural organization of the processor performing the method 600, store-forwarding may be permitted from one speculative thread to another. In such case, at least one embodiment constrains store-forwarding to occur only from logically older (in program order) speculative threads to younger speculative threads.

The foregoing discussion describes selected embodiments of a method and apparatus for performing instruction prefetch and/or trace cache pre-build via speculative pre-execution by a helper thread in a free thread context. For at least one embodiment of the described method, the target point, at which the speculative thread begins execution, is determined. The target point may be selected based on analysis to determine a control-quasi-independent point. Depending on whether all or a subset of the main thread instructions are executed by the helper thread, a hi-fi or porous trace may be pre-built, respectively. At least one embodiment of the apparatus contains mechanisms for blocking the storage of speculative Store data to memory and also for blocking the forwarding of Store data from a speculative thread to a Load instruction in the non-speculative thread.

At least one embodiment of the apparatus discussed herein includes logic that marks a Store instruction and its associated data in a data cache, ROB, and/or MOB as "speculative." Such logic may be implemented in a sequencer. The apparatus may also include a store blocking mechanism, such as store blocker logic 246 illustrated in FIG. 1, that prevents speculative Store data from being committed to memory. Such logic may be included within a memory system and/or may be implemented as a circuit of the MOB.

At least one embodiment of the apparatus discussed herein may include a dependence blocking mechanism, such as dependence blocker logic 236 illustrated in FIG. 1, to prevent speculative Store data from being bypassed to Load instructions of a non-speculative thread. Such logic may be implemented as a circuit of the MOB and/or may be included within a memory system.

In the preceding description, various aspects of a method and apparatus for speculative prefetch of instruction information have been described. For purposes of explanation, specific numbers, examples, systems and configurations were set forth in order to provide a more thorough understanding. However, it is apparent to one skilled in the art that the described method and apparatus may be practiced without the specific details. In other instances, well-known features were omitted or simplified in order not to obscure the method and apparatus.

Embodiments of the method may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the method described herein is not limited in scope to any particular programming language. In any case, the language may be a compiled or interpreted language The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

An example of one such type of processing system is shown in FIG. 11. Sample system 1100 may be used, for example, to execute the processing for a method of dynamically generating an enhanced binary file for speculative multithreading for instruction pre-fetch and/or trace cache pre-build, such as the embodiments described herein. Sample system 1100 may also execute enhanced binary files generated in accordance with at least one embodiment of the methods described herein. Sample system 1100 is representative of processing systems based on the Pentium®, Pentium® Pro, Pentium® II, Pentium® III, Pentium® 4, and Itanium® and Itanium® II microprocessors available from Intel Corporation, although other systems (including personal computers (PCs) having other microprocessors, engineering workstations, personal digital assistants and other hand-held devices, set-top boxes and the like) may also be used. In one embodiment, sample system 1100 may be executing a version of the Windows™ operating system available from Microsoft Corporation, although other operating systems and graphical user interfaces, for example, may also be used.

Referring to FIG. 11, sample processing system 1100 includes a memory system 1102 and a processor 1104. Memory system 1102 may store instructions 1110 and data 1112 for controlling the operation of the processor 1104. For example, instructions 1110 may include a compiler program 1108 that, when executed, causes the processor 1104 to compile a program (such as, for example, 540) that resides in the memory system 1102. Memory 1102 holds the program to be compiled, intermediate forms of the program, and a resulting compiled program. For at least one embodiment, the compiler program 1108 contains instructions that cause the processor 1104 to dynamically generate an enhanced binary file for the program so as to facilitate speculative instruction prefetch and/or trace cache pre-build. For such embodiment, instructions 1110 may also include an enhanced binary file generated in accordance with at least one embodiment of the present invention.

Memory system 1102 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 1102 may store instructions 1110 and/or data 1112 represented by data signals that may be executed by processor 1104. The instructions 1110 and/or data 1112 may include code for performing any or all of the techniques discussed herein. At least one embodiment of speculative pre-execution of main thread instructions to perform instruction pre-fetch and/or trace cache pre-build is related to the use of the compiler 1108 in system 1100 to cause the processor 1104 to dynamically generate an enhanced binary file as described above.

Specifically, FIG. 11 illustrates that compiler 1108 may include a cache miss identifier module 1120 that, when executed by the processor 1104, identifies 510 one or more code regions that are predicted to incur significant performance loss due to cache misses, as described above in connection with FIG. 5

The compiler 1108 may also include, as illustrated in FIG. 11, a spawn pair identifier 1124 that, when executed by the processor 1104, identifies 520 candidate spawning pairs as described above in connection with FIG. 5. For at least one embodiment, the candidate spawning pairs each include a spawn point and a control-quasi-independent point.

As illustrated in FIG. 11, the compiler 1108 may also include a selector module 1126 that, when executed by the processor 1104, selects 525 one or more of the candidate spawning pairs as discussed above in connection with FIG. 5.

FIG. 11 illustrates that the compiler 1108 may also include a code generator module 1128 that, when executed by the processor 1104, generates 530 an enhanced binary file 550 as described above in connection with FIG. 5.

While particular embodiments of the present invention have been shown and described, it will be obvious to those skilled in the art that changes and modifications can be made without departing from the present invention in its broader aspects. The appended claims are to encompass within their scope all such changes and modifications that fall within the true scope of the present invention.

What is claimed is:
1. A method comprising:
 identifying a code region in an original binary that is predicted to incur a threshold quantity of performance loss during execution of the code region based on one or more predicted cache misses;
identifying one or more spawning pairs that each includes a spawn point and a target point;
selecting one of the one or more spawning pairs, the target point of the selected spawning pair being associated with the code region, wherein the selecting is based at least in part on a number of dependent instructions that a speculative thread includes in relation to code between the spawn point and the target point;
generating an enhanced binary code from the original binary that includes one or more instructions to cause, during execution of a first thread, spawning of a second thread at the selected spawn point; and
speculatively pre-executing an instruction associated with the selected target point on the second thread ahead of a portion of the code that begins at the target point, wherein in response to executing the instruction with the second thread a future instruction for the first thread is prefetched into a cache.

2. The method of claim 1, wherein: the target point for each of the one or more identified spawning pairs is a control-quasi-independent point.

3. The method of claim 1, wherein: identifying one or more spawning pairs further includes approximating a reaching probability for each of the spawning pairs.

4. The method of claim 1, wherein the cache includes an instruction cache, and wherein the future instruction includes a decoded future instruction.

5. The method of claim 1, wherein: the cache includes a trace cache, and wherein the future instruction includes future traces of decoded micro-operations.

6. The method of claim 1, further comprising:
marking instruction information from the second thread as originating in a speculative thread.

7. The method of claim 1, wherein the cache is a trace cache.

8. An article comprising:
a machine-readable storage medium having a plurality of machine accessible instructions which, if executed by a machine, cause the machine to perform operations comprising:
identify a code region in an original binary that is predicted to incur a threshold quantity of performance loss during execution of the code region based on one or more cache misses;
identify one or more spawning pairs that each includes a spawn point and a target point;
select one of the one or more spawning pairs, the target point of the selected spawning pair being associated with the code region, based at least in part on a number of dependent instructions that a speculative thread includes in relation to code between the spawn point and the target point; and
generate an enhanced binary code from the original binary that includes one or more instructions to cause, during execution of a first thread; and
speculatively pre-execute an instruction associated with the selected target point on the second thread ahead of a portion of the code that begins at the target point, wherein in response to executing the instruction with the second thread a future instruction for the first thread is prefetched into an instruction cache.

9. The article of claim 8, wherein: the target point for each of the one or more identified spawning pairs is a control-quasi-independent point.

10. The article of claim 8, wherein: instructions that provide for identifying one or more spawning pairs further include instructions that provide for approximating a reaching probability for each of the spawning pairs.

11. The article of claim 10, wherein: instructions that provide for identifying one or more spawning pairs further include instructions that provide for identifying spawning pairs that have at least a threshold approximated reaching probability.

12. The article of claim 8, wherein: instructions for selecting further include instructions that provide for determining that the selected spawning pair encompasses the code region.

13. The article of claim 8, further comprising:
marking instruction information from the second thread as originating in a speculative thread.

14. The article of claim 8, wherein the cache is a trace cache.

* * * * *